(12) United States Patent
Wei et al.

(10) Patent No.: US 12,315,959 B2
(45) Date of Patent: May 27, 2025

(54) SECONDARY BATTERY COMPRISING INSULATION MEMBER

(71) Applicant: CONTEMPORARY AMPEREX TECHNOLOGY (HONG KONG) LIMITED, Hong Kong (CN)

(72) Inventors: Xichen Wei, Ningde (CN); Baojian Zhu, Ningde (CN); Shoujiang Xu, Ningde (CN); Lei Chen, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 640 days.

(21) Appl. No.: 17/557,172

(22) Filed: Dec. 21, 2021

(65) Prior Publication Data
US 2022/0115751 A1    Apr. 14, 2022

Related U.S. Application Data

(63) Continuation of application No. PCT/CN2020/104706, filed on Jul. 26, 2020.

(30) Foreign Application Priority Data

Aug. 13, 2019    (CN) .................. 201921309828.X

(51) Int. Cl.
*H01M 50/533*    (2021.01)
*H01M 10/04*    (2006.01)
(Continued)

(52) U.S. Cl.
CPC ..... *H01M 50/533* (2021.01); *H01M 10/0431* (2013.01); *H01M 50/103* (2021.01); *H01M 50/147* (2021.01); *H01M 50/553* (2021.01)

(58) Field of Classification Search
CPC ............. H01M 50/533; H01M 50/534; H01M 50/536; H01M 50/103; H01M 50/553;
(Continued)

(56) References Cited

FOREIGN PATENT DOCUMENTS

| CN | 206076349 U | 4/2017 |
|---|---|---|
| CN | 207818740 U | 9/2018 |

(Continued)

OTHER PUBLICATIONS

International Search Report issued on Oct. 22, 2020, in corresponding International Application PCT/CN2020/104706; 6 pages (with English Translation).

(Continued)

*Primary Examiner* — Raymond Alejandro
(74) *Attorney, Agent, or Firm* — K&L Gates LLP

(57) ABSTRACT

A secondary battery. The secondary battery includes an electrode assembly, a housing, a top cover assembly, a current collecting member, and an insulation member. The electrode assembly is accommodated in the housing and includes a body portion and a first tab. The first tab extends from one end of the body portion in a transverse direction. The top cover assembly includes a top cover plate and a first electrode terminal disposed on the top cover plate. The top cover plate is connected to the housing, and the first electrode terminal is connected to the current collecting member. The insulation member is disposed between the body portion and the current collecting member. The insulation member includes a through gap. The first tab passes.

20 Claims, 6 Drawing Sheets

(51) Int. Cl.
  *H01M 50/103* (2021.01)
  *H01M 50/147* (2021.01)
  *H01M 50/553* (2021.01)

(58) Field of Classification Search
  CPC ............. H01M 50/552; H01M 50/147; H01M 10/0431; H01M 10/045
  See application file for complete search history.

(56) References Cited

FOREIGN PATENT DOCUMENTS

| | | | | |
|---|---|---|---|---|
| CN | 207938699 U | 10/2018 | | |
| CN | 208298915 U | 12/2018 | | |
| CN | 208819970 U | 5/2019 | | |
| CN | 210136894 U | 3/2020 | | |
| EP | 3451416 A1 * | 3/2019 | ........ | H01M 10/0431 |
| EP | 3518310 A1 | 7/2019 | | |
| JP | 2014203514 A | 10/2014 | | |
| WO | 2019114780 A1 | 6/2019 | | |

OTHER PUBLICATIONS

Extended European Search Report issued on May 10, 2022, in connection with corresponding European Application No. 20853108.7; 7 pages.

* cited by examiner

SECONDARY BATTERY COMPRISING INSULATION MEMBER

CROSS-REFERENCE TO RELATED APPLICATIONS

This application is a continuation of International Application No. PCT/CN2020/104706, filed on Jul. 26, 2020, which claims priority to Chinese Patent Application No. 201921309828.X, filed to the China National Intellectual Property Administration on Aug. 13, 2019 and entitled "SECONDARY BATTERY". The disclosures of the aforementioned applications are hereby incorporated by reference in their entireties.

TECHNICAL FIELD

This application relates to the field of batteries, and in particular, to a secondary battery.

BACKGROUND

A secondary battery generally includes an electrode assembly, a housing, electrode terminals, and a current collecting member. The current collecting member is configured to electrically connect the electrode assembly and the electrode terminals. Generally, tabs are disposed on the electrode assembly, and the tabs are connected to the current collecting member. The tabs are relatively long. To reduce space occupied by the tabs, the tabs are generally bent. However, for lack of support at a root of the tabs, the tabs are very likely to be inserted into the electrode assembly during the bending, thereby causing short-circuit risks.

SUMMARY

In view of problems in background technologies, an objective of this application is to provide a secondary battery, and the secondary battery can reduce short-circuit risks and improve safety performance.

To achieve the objective, an embodiment of this application provides a secondary battery. The secondary battery includes an electrode assembly, a housing, a top cover assembly, a current collecting member, and an insulation member. The electrode assembly is accommodated in the housing and includes a body portion and a first tab. The first tab extends from one end of the body portion in a transverse direction. The top cover assembly includes a top cover plate and a first electrode terminal disposed on the top cover plate. The top cover plate is connected to the housing, and the first electrode terminal is connected to the current collecting member. The insulation member is disposed between the body portion and the current collecting member. The insulation member includes a through gap. The first tab passes through the gap and is connected to the current collecting member.

In the secondary battery described above, the insulation member includes a substrate and a protrusion. The protrusion extends from a surface of the substrate, the surface being away from the body portion in the transverse direction. The gap extends from a surface of the protrusion and runs through the protrusion and the substrate, the surface being away from the substrate. The current collecting member includes a first current collecting plate. The first current collecting plate is located on a side of the substrate and fits snugly with the body portion, the side being away from the body portion. The protrusion is located at a lateral position of the first current collecting plate in a longitudinal direction. The first current collecting plate is connected to the first tab.

In the secondary battery described above, in the transverse direction, a thickness of the protrusion is less than or equal to a thickness of the first current collecting plate.

In the secondary battery described above, the protrusion of the insulation member is plural in number. The plurality of protrusions include a first protrusion and a second protrusion arranged in the longitudinal direction. The first current collecting plate is located between the first protrusion and the second protrusion. The gap is plural in number. The plurality of gaps include a first gap and a second gap. The first gap runs through the first protrusion and the substrate, and the second gap runs through the second protrusion and the substrate. The electrode assembly is plural in number. The plurality of electrode assemblies include a first electrode assembly and a second electrode assembly. The first tab of the first electrode assembly passes through the first gap and is connected to the first current collecting plate. The first tab of the second electrode assembly passes through the second gap and is connected to the first current collecting plate.

In the secondary battery described above, in a height direction, the first gap and the second gap are staggered. The first tab passing through the first gap is bent toward a side close to the second electrode assembly and is connected to the first current collecting plate. The first tab passing through the second gap is bent toward a side close to the first electrode assembly and is connected to the first current collecting plate.

In the secondary battery described above, each protrusion includes a first region and a second region. The first region and the second region are arranged along a height direction. In the longitudinal direction, a width of the first region is greater than a width of the second region. The first gap runs through the first region of the first protrusion, and the second gap runs through the first region of the second protrusion. Along the height direction, an arrangement direction of the first region and the second region of the first protrusion is opposite to an arrangement direction of the first region and the second region of the second protrusion.

In the secondary battery described above, in the longitudinal direction, an edge of the first region is flush with an edge of the second region, in each case the edge that is close to the first current collecting plate.

In the secondary battery described above, a via hole is disposed in the body portion. The via hole is formed on at least one side of the first protrusion, the side being away from the first current collecting plate.

In the secondary battery described above, the plurality of protrusions include a third protrusion and a fourth protrusion. The first protrusion, the second protrusion, the third protrusion, and the fourth protrusion are arranged sequentially along the longitudinal direction. The current collecting member further includes a second current collecting plate. The second current collecting plate is located between the third protrusion and the fourth protrusion. The plurality of gaps further include a third gap and a fourth gap. The third gap runs through the third protrusion and the substrate. The fourth gap runs through the fourth protrusion and the substrate. The plurality of electrode assemblies include a third electrode assembly and a fourth electrode assembly. The first tab of the third electrode assembly passes through the third gap and is connected to the second current collecting plate. The first tab of the fourth electrode assembly passes through the fourth gap and is connected to the second current collecting plate.

In the secondary battery described above, the insulation member is bonded to the current collecting member.

Beneficial effects of this application are as follows: in the secondary battery provided in the embodiments of this application, the gap of the insulation member can tuck the tabs and restrain the tabs from deforming in a process of bending the tabs, thereby reducing risks of inserting a root region of the tabs into the body portion, avoiding a short circuit, and improving safety performance.

DETAILED DESCRIPTION OF THE EMBODIMENTS

Figure 1:
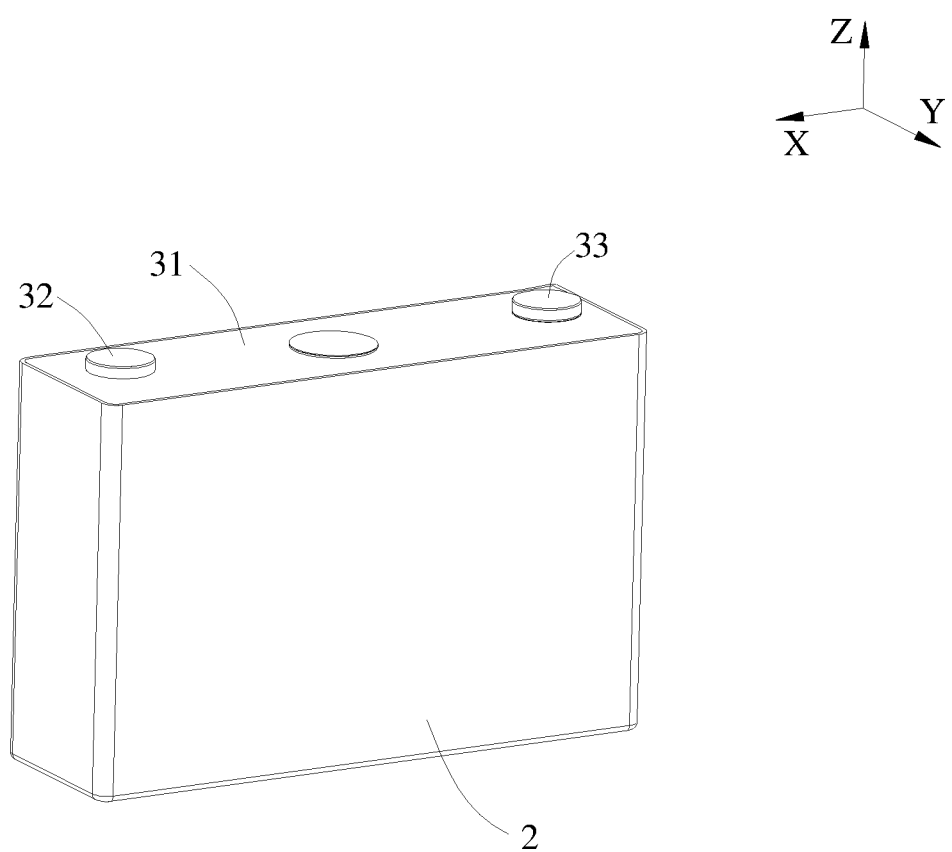
FIG. 1 is a schematic diagram of a secondary battery according to an embodiment of this application.

To make the objectives, technical solutions, and advantages of this application clearer, the following describes this application in further detail with reference to accompanying drawings and embodiments. Understandably, the specific embodiments described herein are merely intended to explain this application, but are not intended to limit this application.

In the context of this application, unless otherwise expressly specified, the terms such as "first", "second", and "third" are for the sole purpose of description rather than indicating or implying any order of preference; the term "a plurality of" means two or more (including two); unless otherwise expressly specified, the term "connect" needs to be understood in a broad sense. For example, a "connection" may be a fixed connection, or a detachable connection, or an integrated connection, or an electrical connection or signal connection; or may be a direct connection or an indirect connection implemented through an intermediate medium. A person of ordinary skill in the art can understand the specific meanings of the terms in this application according to the context.

Understandably, in the context of this application, directional terms such as "on", "above", "under", and "below" described in the embodiments of this application are described from a perspective shown in the drawings, and are not to be understood as a limitation on the embodiments of this application. The following describes this application in further detail with reference to specific embodiments and accompanying drawings.

Figure 2:
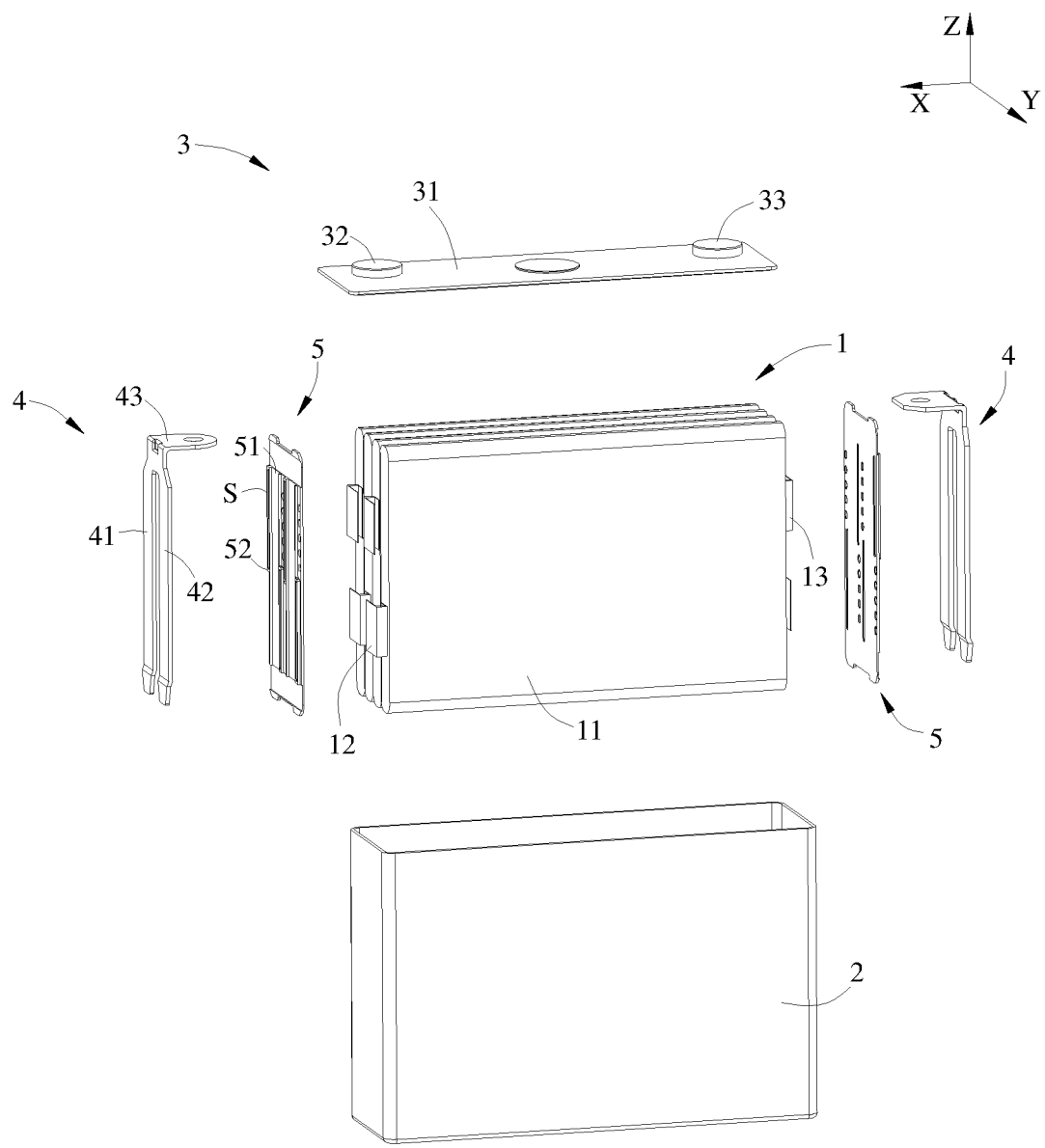
FIG. 2 is an exploded view of a secondary battery according to an embodiment of this application.

Referring to FIG. 1 and FIG. 2, a secondary battery according to this application includes an electrode assembly 1, a housing 2, a top cover assembly 3, a current collecting member 4, and an insulation member 5.

Figure 3:
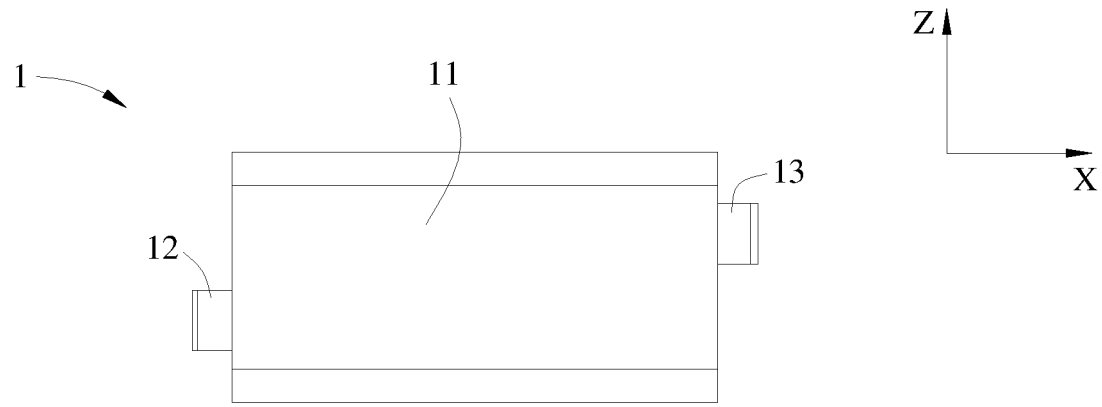
FIG. 3 is a schematic diagram of an electrode assembly of a secondary battery according to an embodiment of this application.
Figure 4:
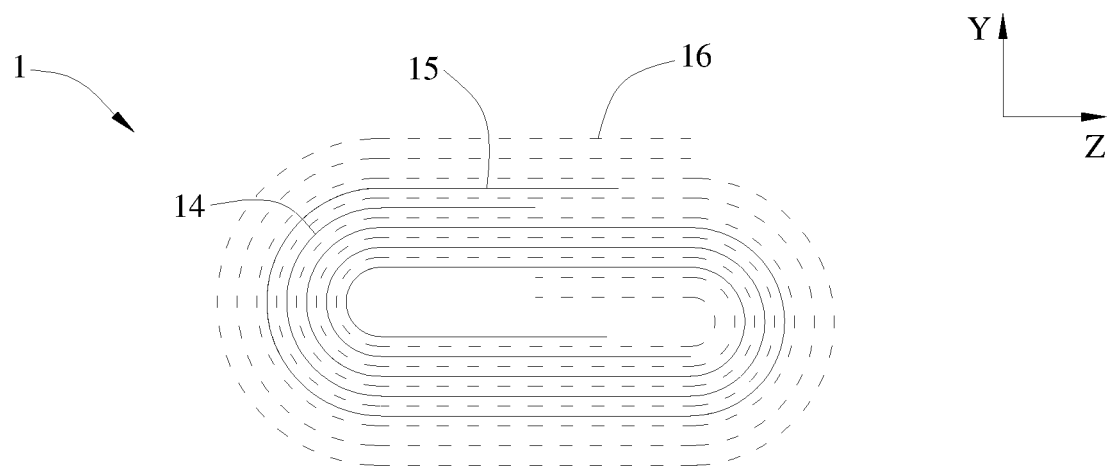
FIG. 4 is a sectional view of the electrode assembly shown in FIG. 3.

Referring to FIG. 3 and FIG. 4, the electrode assembly 1 includes a first electrode plate 14, a second electrode plate 15, and a separator 16. The separator 16 is disposed between the first electrode plate 14 and the second electrode plate 15. The electrode assembly 1 is formed by spirally winding the first electrode plate 14, the separator 16, and the second electrode plate 15, and forms a flat structure by being pressed under a pressure. The electrode assembly 1 is a core part for the secondary battery to implement functions of charging and discharging.

The first electrode plate 14 includes a first current collector and a first active material layer coated on a surface of the first current collector. The first electrode plate 14 may be a positive electrode plate. The first current collector is an aluminum foil. The first active material layer includes active materials such as lithium manganate and lithium iron phosphate. The active materials (such as lithium manganate and lithium iron phosphate), a binder, a conductive agent, and a solvent may be made into a slurry, and then the slurry may be coated on both surfaces of the first current collector. After the slurry is cured, the first active material layer is formed.

Figure 5:
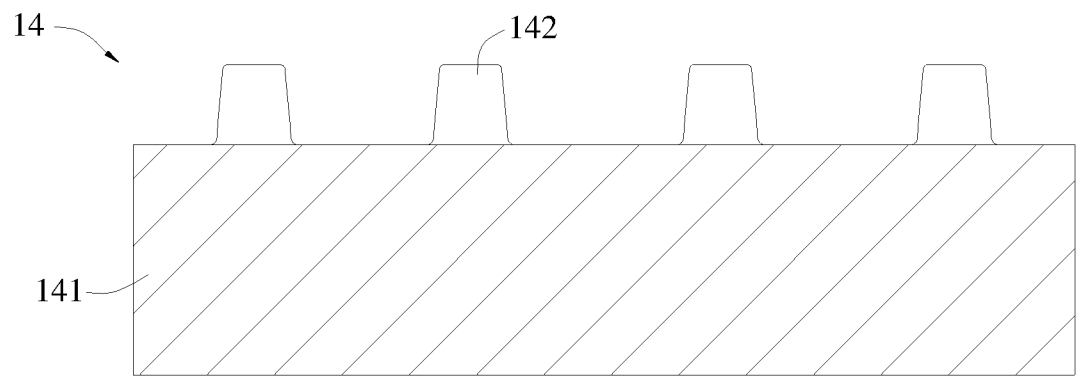
FIG. 5 is a schematic diagram of a first electrode plate of an electrode assembly of a secondary battery when the first electrode plate is in an expanded state according to an embodiment of this application.

Merely a part of the first current collector is coated with the first active material layer. Referring to FIG. 5, the first active material layer and a region that is of the first current collector and coated with the first active material layer form a first coated region 141 of the first electrode plate 14. A region that is of the first current collector and not coated with the first active material layer forms a first uncoated region 142 of the first electrode plate 14. The first uncoated regions 142 may be plural in number and are spaced out. After the first electrode plate 14 is wound into shape, the plurality of first uncoated regions 142 are stacked together.

The second electrode plate 15 includes a second current collector and a second active material layer coated on a surface of the second current collector. The second active material layer and a region that is of the second current collector and coated with the second active material layer form a second coated region of the second electrode plate 15. The region that is of the second current collector and not coated with the second active material layer forms a second uncoated region of the second electrode plate 15. The second uncoated regions may be plural in number and are spaced out. After the second electrode plate 15 is wound into shape, the plurality of second uncoated regions are stacked together. The second electrode plate 15 is similar to the first electrode plate 14 in structure, but differs in that the second current collector may be made of a copper foil material and the second active material layer includes an active material such as graphite or silicon.

The separator 16 may be a polyethylene (PE) film, a polypropylene (PP) film, or a PP-PE-PP three-layered composite film.

After the electrode assembly 1 is wound into shape, from a perspective of an appearance of the electrode assembly 1, the electrode assembly 1 includes a body portion 11, a first tab 12, and a second tab 13. The body portion 11 includes the first coated region 141, the separator 16, and the second coated region of the second electrode plate 15. The first tab 12 includes a plurality of first uncoated regions 142 stacked together. The second tab 13 includes a plurality of second uncoated regions stacked together.

A spool of the electrode assembly 1 is substantially parallel to a transverse direction X. The first tab 12 extends from one end of the body portion 11 in the transverse direction X. The second tab 13 extends from the other end of the body portion 11 in the transverse direction X.

The housing 2 may be in a hexahedral shape or another shape. The housing 2 forms an accommodation cavity interiorly to accommodate the electrode assembly 1 and an electrolytic solution. The housing 2 forms an opening at one end, and the electrode assembly 1 can be placed into the accommodation cavity of the housing 2 through the opening. The housing 2 may be made of a conductive metal material. Optionally, the housing 2 is made of aluminum or an aluminum alloy.

The top cover assembly 3 includes a top cover plate 31, a first electrode terminal 32, and a second electrode terminal 33. The top cover plate 31 is disposed on the housing 2 and covers the opening of the housing 2 to enclose the electrode assembly 1 in the housing 2. The top cover plate 31 may be connected to the housing 2 by welding or by other means. The first electrode terminal 32 and the second electrode terminal 33 are disposed on the top cover plate 31. The first electrode terminal 32 is electrically connected to the first tab 12, and the second electrode terminal 33 is electrically connected to the second tab 13.

There may be two current collecting members 4. One current collecting member 4 is connected to the first tab 12 and the first electrode terminal 32. The other current collecting member 4 is connected to the second tab 13 and the second electrode terminal 33.

The first tab 12 includes a plurality of layers of first uncoated regions 142. The plurality of layers of first uncoated regions 142 are welded onto the current collecting member 4. After completion of the welding, to reduce space occupied by the first tab 12, the first tab 12 is generally bent. However, for the part located between a weld region and the body portion 11 in the first uncoated region 142, the plurality of layers of first uncoated regions 142 are in a dispersed state. In a process of bending the first tab 12, the plurality of layers of first uncoated regions 142 in the dispersed state lack support. Therefore, a root of each first uncoated region 142 is very likely to be deformed and inserted inwardly into the body portion 11, thereby causing a short-circuit risk.

Figure 6:
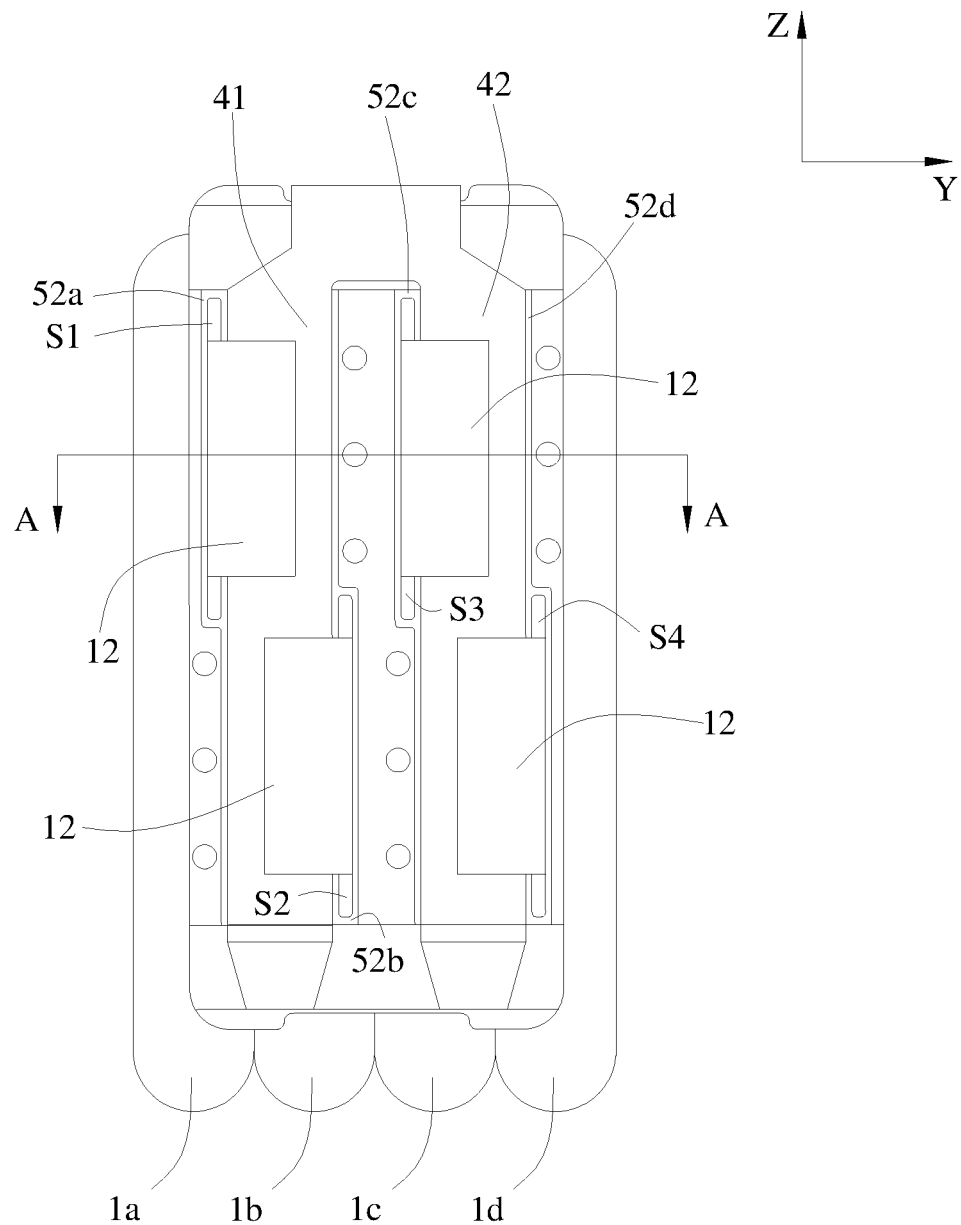
FIG. 6 is a schematic diagram of an electrode assembly, a current collecting member, and an insulation member of a secondary battery according to an embodiment of this application.
Figure 7:
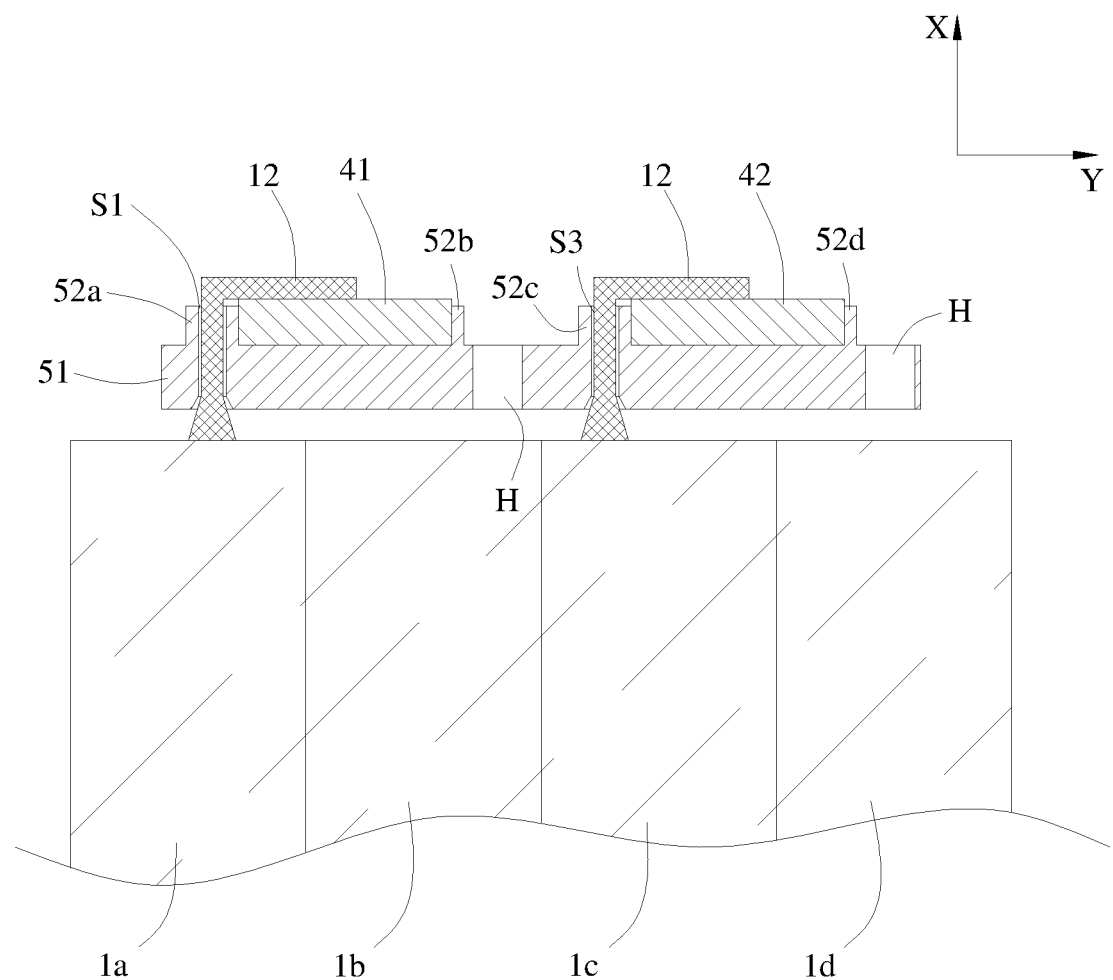
FIG. 7 is a cross-sectional view along an A-A section line shown in FIG. 6.
Figure 8:
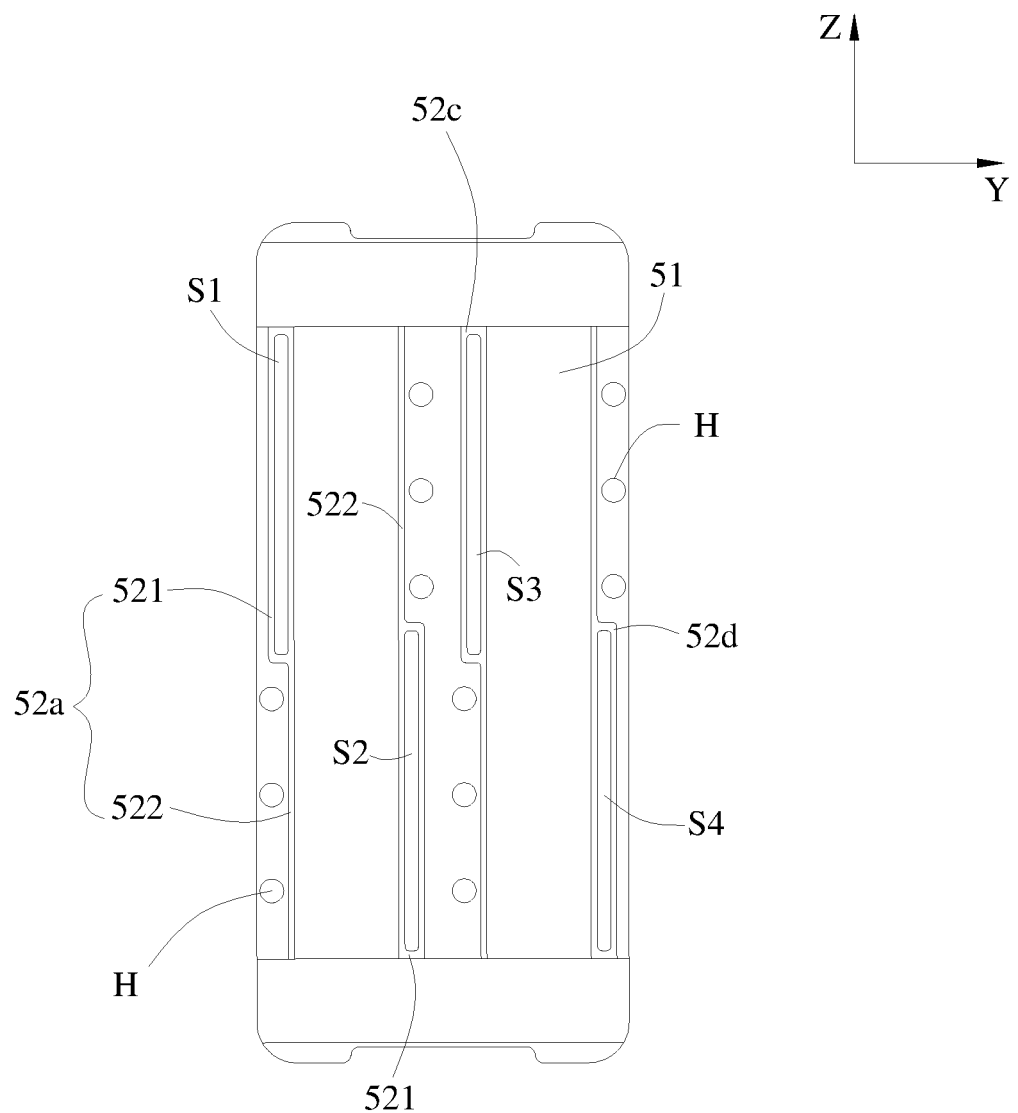
FIG. 8 is a schematic diagram of the insulation member shown in FIG. 6.

Therefore, optionally, an insulation member 5 is disposed on one side of the body portion 11 according to this application. Referring to FIG. 6 to FIG. 8, the insulation member 5 is disposed between the body portion 11 and the current collecting member 4, and the insulation member 5 includes a through gap S. The gap S may be slit-shaped.

The first tab 12 passes through the gap S and is connected to the current collecting member 4. The part at which the first tab 12 passes through the gap S may be welded to the current collecting member 4. The gap S can tuck the plurality of layers of first uncoated regions 142 of the first tab 12 together.

In this application, the gap S of the insulation member 5 can tuck the first tab 12 and restrain the first tab 12 from deforming in a process of bending the first tab 12, thereby reducing risks of inserting the root of the first tab 12 into the body portion 11, avoiding a short circuit, and improving safety performance.

The insulation member 5 may be fixed to the current collecting member 4 to prevent the insulation member 5 from shaking in the secondary battery. For example, the insulation member 5 may be bonded to the current collecting member 4.

The insulation member 5 includes a substrate 51 and a protrusion 52. The protrusion 52 extends from a surface of the substrate 51, the surface being away from the body portion 11 in the transverse direction X. The substrate 51 is approximately a flat plate perpendicular to the transverse direction X. The gap S extends from a surface of the protrusion 52 and runs through the protrusion 52 and the substrate 51, the surface being away from the substrate 51. The protrusion 52 disposed can increase a depth of the gap S in the transverse direction X, so as to increase the ability of the gap S to tuck the first tab 12.

The current collecting member 4 includes a first current collecting plate 41 and a terminal connecting plate 43. The first current collecting plate 41 extends in a direction approximately perpendicular to the transverse direction X. The first current collecting plate 41 is located on a side of the substrate 51, the side being away from the body portion 11. The terminal connecting plate 43 is bent against the first current collecting plate 41, and connects the first current collecting plate 41 and the first electrode terminal 32. The terminal connecting plate 43 may be located above the substrate 51 in a height direction Z.

The first current collecting plate 41 fits snugly with the body portion 11. Optionally, the first current collecting plate 41 is bonded to the body portion 11.

The protrusion 52 is located at a lateral position of the first current collecting plate 41 in a longitudinal direction Y. This avoids superimposing the protrusion 52 on the first current collecting plate 41 in the transverse direction X, reduces the space occupied by the insulation member 5 and the current collecting member 4 in the transverse direction X, and increases the energy density.

The first current collecting plate 41 is connected to the first tab 12. After passing through the gap S, the first tab 12 may be connected to the first current collecting plate 41 by ultrasonic welding.

Referring to FIG. 7, in the transverse direction X, a thickness of the protrusion 52 is less than or equal to a thickness of the first current collecting plate 41. This prevents the protrusion 52 from occupying additional space in the transverse direction X.

Referring to FIG. 6 and FIG. 8, the protrusion 52 of the insulation member 5 is plural in number, and the plurality of protrusions 52 include a first protrusion 52a and a second protrusion 52b arranged in the longitudinal direction Y. The first current collecting plate 41 is located between the first protrusion 52a and the second protrusion 52b. The first protrusion 52a and the second protrusion 52b can support the first current collecting plate 41 from both sides, restrain the first current collecting plate 41 from shaking, and reduce risks of rupturing the first tab 12. In addition, the first protrusion 52a and the second protrusion 52b also help to position and assemble the first current collecting plate 41.

To increase a capacity of the secondary battery, a plurality of electrode assemblies 1 are generally disposed. If the first tabs 12 of the plurality of electrode assemblies 1 pass through an identical gap S, the plurality of first tabs 12 may be rather staggered, thereby making it more difficult to tuck the first tabs 12.

Therefore, optionally, a plurality of gaps S are disposed. The plurality of gaps S include a first gap S1 and a second gap S2. The first gap S1 runs through the first protrusion 52a and the substrate 51. The second gap S2 runs through the second protrusion 52b and the substrate 51.

The plurality of electrode assemblies 1 include a first electrode assembly 1a and a second electrode assembly 1b. The first tab 12 of the first electrode assembly 1a passes through the first gap S1 and is connected to the first current collecting plate 41. The first tab 12 of the second electrode assembly 1b passes through the second gap S2 and is connected to the first current collecting plate 41.

In the height direction Z, the first gap S1 and the second gap S2 are staggered. In other words, in the height direction Z, the first gap S1 and the second gap S2 are at different heights. The first tab 12 passing through the first gap S1 is bent toward a side close to the second electrode assembly 1b and is connected to the first current collecting plate 41. The first tab 12 passing through the second gap S2 is bent toward a side close to the first electrode assembly 1a and is connected to the first current collecting plate 41.

If the first tab 12 of the first electrode assembly 1a is flush with the first tab 12 of the second electrode assembly 1b in the height direction Z, the first tab 12 of the first electrode assembly 1a and the first tab 12 of the second electrode assembly 1b are likely to be stacked together. This increases the difficulty of welding and causes risks of poor welding. However, in this application, the first gap S1 and the second gap S2 are staggered longitudinally. Therefore, the first tab 12 of the first electrode assembly 1a and the first tab 12 of the second electrode assembly 1b can be staggered longitudinally to avoid stacking the first tab 12 of the first electrode assembly 1a and the first tab 12 of the second electrode assembly 1b together and reduce risks of poor welding.

Referring to FIG. 6 and FIG. 8, each protrusion 52 includes a first region 521 and a second region 522. The first region 521 and the second region 522 are arranged along the height direction Z. In the longitudinal direction Y, a width of the first region 521 is greater than a width of the second region 522. The first gap S1 runs through the first region 521 of the first protrusion 52a. The second gap S2 runs through the first region 521 of the second protrusion 52b.

In this application, the width of the first region 521 is increased so that it is convenient to open the gap S in the first region 521. For the second region 522 in which no gap S needs to be opened, the width of the second region 522 may be reduced appropriately to reduce the space occupied by the second region 522 and increase the energy density.

Along the height direction Z, an arrangement direction of the first region 521 and the second region 522 of the first protrusion 52a is opposite to an arrangement direction of the first region 521 and the second region 522 of the second protrusion 52b. This causes the first gap S1 and the second gap S2 to be staggered longitudinally.

In the longitudinal direction Y, an edge of the first region 521 is flush with an edge of the second region 522, in each case the edge that is close to the first current collecting plate 41. The flush arranged edges of the first region 521 and the second region 522 can more effectively support the first current collecting plate 41 and retrain the first current collecting plate 41 from shaking in the longitudinal direction Y.

A via hole H is disposed in the body portion 11. The via hole H is formed on at least one side of the first protrusion 52a, the side being away from the first current collecting plate 41. An electrolytic solution inside the housing 2 can freely pass through the via hole H, thereby ensuring high infiltration performance of the electrolytic solution and increasing a cycle life. Optionally, the via hole H is further formed on a side of the second protrusion 52b, the side being away from the first current collecting plate 41.

The plurality of electrode assemblies 1 include a third electrode assembly 1c and a fourth electrode assembly 1d. Optionally, the current collecting member 4 further includes a second current collecting plate 42. The second current collecting plate 42 electrically connects the third electrode assembly 1c and the fourth electrode assembly 1d to the first electrode terminal 32.

The plurality of protrusions 52 include a third protrusion 52c and a fourth protrusion 52d. The first protrusion 52a, the second protrusion 52b, the third protrusion 52c, and the fourth protrusion 52d are arranged sequentially along the longitudinal direction Y. The second current collecting plate 42 is located between the third protrusion 52c and the fourth protrusion 52d. The third protrusion 52c and the fourth protrusion 52d support the second current collecting plate 42 from both sides, restrain the second current collecting plate 42 from shaking, and reduce risks of rupturing the first tab 12. In addition, the third protrusion 52c and the fourth protrusion 52d also help to position and assemble the second current collecting plate 42.

The plurality of gaps S further include a third gap S3 and a fourth gap S4. The third gap S3 runs through the third protrusion 52c and the substrate 51. The fourth gap S4 runs through the fourth protrusion 52d and the substrate 51.

The first tab 12 of the third electrode assembly 1c passes through the third gap S3 and is connected to the second current collecting plate 42. The first tab 12 of the fourth electrode assembly 1d passes through the fourth gap S4 and is connected to the second current collecting plate 42.

A shape of the third protrusion 52c is identical to a shape of the first protrusion 52a, and a shape of the fourth protrusion 52d is identical to a shape of the second protrusion 52b. In the height direction Z, the third gap S3 and the fourth gap S4 are staggered. The via hole H is further formed between the second protrusion 52b and the third protrusion 52c.

What is claimed is:

1. A secondary battery, comprising: an electrode assembly, a housing, a top cover assembly, a current collecting member, and an insulation member; wherein,
   the electrode assembly is accommodated in the housing and comprises a body portion and a first tab, and the first tab extends from one end of the body portion in a transverse direction;
   the top cover assembly comprises a top cover plate and a first electrode terminal disposed on the top cover plate, the top cover plate is connected to the housing, and the first electrode terminal is connected to the current collecting member;
   the insulation member is disposed between the body portion and the current collecting member, and the insulation member comprises a substrate, a protrusion, and a through gap, the protrusion extends from a surface of the substrate, the surface being away from the body portion in the transverse direction; and
   the first tab passes through the gap and is connected to the current collecting member.

2. The secondary battery according to claim 1, wherein
   the gap extends from a surface of the protrusion and runs through the protrusion and the substrate, the surface being away from the substrate;
   the current collecting member comprises a first current collecting plate, and the first current collecting plate is located on a side of the substrate and fits snugly with the body portion, the side being away from the body portion; and the protrusion is located at a lateral position of the first current collecting plate in a longitudinal direction; and
   the first current collecting plate is connected to the first tab.

3. The secondary battery according to claim 2, wherein, in the transverse direction, a thickness of the protrusion is less than or equal to a thickness of the first current collecting plate.

4. The secondary battery according to claim 2, wherein the protrusion of the insulation member is plural in number, and the plurality of protrusions comprise a first protrusion and a second protrusion arranged in the longitudinal direction;
the first current collecting plate is located between the first protrusion and the second protrusion;
the gap is plural in number, the plurality of gaps comprise a first gap and a second gap, the first gap runs through the first protrusion and the substrate, and the second gap runs through the second protrusion and the substrate; and
the electrode assembly is plural in number, the plurality of electrode assemblies comprise a first electrode assembly and a second electrode assembly, the first tab of the first electrode assembly passes through the first gap and is connected to the first current collecting plate, and the first tab of the second electrode assembly passes through the second gap and is connected to the first current collecting plate.

5. The secondary battery according to claim 4, wherein in a height direction, the first gap and the second gap are staggered;
the first tab passing through the first gap is bent toward a side close to the second electrode assembly and is connected to the first current collecting plate, and the first tab passing through the second gap is bent toward a side close to the first electrode assembly and is connected to the first current collecting plate.

6. The secondary battery according to claim 4, wherein each protrusion comprises a first region and a second region, and the first region and the second region are arranged along a height direction; in the longitudinal direction, a width of the first region is greater than a width of the second region;
the first gap runs through the first region of the first protrusion, and the second gap runs through the first region of the second protrusion; and
along the height direction, an arrangement direction of the first region and the second region of the first protrusion is opposite to an arrangement direction of the first region and the second region of the second protrusion.

7. The secondary battery according to claim 6, wherein, in the longitudinal direction, an edge of the first region is flush with an edge of the second region, and, in each case, the edge that is close to the first current collecting plate.

8. The secondary battery according to claim 4, wherein a via hole is disposed in the body portion, and the via hole is formed on at least one side of the first protrusion, the side being away from the first current collecting plate.

9. The secondary battery according to claim 4, wherein the plurality of protrusions comprise a third protrusion and a fourth protrusion, the first protrusion, the second protrusion, the third protrusion and the fourth protrusion are arranged sequentially along the longitudinal direction;
the current collecting member further comprises a second current collecting plate, and the second current collecting plate is located between the third protrusion and the fourth protrusion;
the plurality of gaps further comprise a third gap and a fourth gap, the third gap runs through the third protrusion and the substrate, and the fourth gap runs through the fourth protrusion and the substrate; and
the plurality of electrode assemblies comprise a third electrode assembly and a fourth electrode assembly, the first tab of the third electrode assembly passes through the third gap and is connected to the second current collecting plate, and the first tab of the fourth electrode assembly passes through the fourth gap and is connected to the second current collecting plate.

10. The secondary battery according to claim 1, wherein the insulation member is bonded to the current collecting member.

11. The secondary battery according to claim 3, wherein the protrusion of the insulation member is plural in number, and the plurality of protrusions comprise a first protrusion and a second protrusion arranged in the longitudinal direction;
the first current collecting plate is located between the first protrusion and the second protrusion;
the gap is plural in number, the plurality of gaps comprise a first gap and a second gap, the first gap runs through the first protrusion and the substrate, and the second gap runs through the second protrusion and the substrate; and
the electrode assembly is plural in number, the plurality of electrode assemblies comprise a first electrode assembly and a second electrode assembly, the first tab of the first electrode assembly passes through the first gap and is connected to the first current collecting plate, and the first tab of the second electrode assembly passes through the second gap and is connected to the first current collecting plate.

12. The secondary battery according to claim 5, wherein each protrusion comprises a first region and a second region, and the first region and the second region are arranged along a height direction; in the longitudinal direction, a width of the first region is greater than a width of the second region;
the first gap runs through the first region of the first protrusion, and the second gap runs through the first region of the second protrusion; and
along the height direction, an arrangement direction of the first region and the second region of the first protrusion is opposite to an arrangement direction of the first region and the second region of the second protrusion.

13. The secondary battery according to claim 5, wherein a via hole is disposed in the body portion, and the via hole is formed on at least one side of the first protrusion, the side being away from the first current collecting plate.

14. The secondary battery according to claim 6, wherein a via hole is disposed in the body portion, and the via hole is formed on at least one side of the first protrusion, the side being away from the first current collecting plate.

15. The secondary battery according to claim 7, wherein a via hole is disposed in the body portion, and the via hole is formed on at least one side of the first protrusion, the side being away from the first current collecting plate.

16. The secondary battery according to claim 5, wherein the plurality of protrusions comprise a third protrusion and a fourth protrusion, the first protrusion, the second protrusion, the third protrusion and the fourth protrusion are arranged sequentially along the longitudinal direction;
the current collecting member further comprises a second current collecting plate, and the second current collecting plate is located between the third protrusion and the fourth protrusion;

the plurality of gaps further comprise a third gap and a fourth gap, the third gap runs through the third protrusion and the substrate, and the fourth gap runs through the fourth protrusion and the substrate; and the plurality of electrode assemblies comprise a third electrode assembly and a fourth electrode assembly, the first tab of the third electrode assembly passes through the third gap and is connected to the second current collecting plate, and the first tab of the fourth electrode assembly passes through the fourth gap and is connected to the second current collecting plate.

17. The secondary battery according to claim 6, wherein the plurality of protrusions comprise a third protrusion and a fourth protrusion, the first protrusion, the second protrusion, the third protrusion and the fourth protrusion are arranged sequentially along the longitudinal direction;

the current collecting member further comprises a second current collecting plate, and the second current collecting plate is located between the third protrusion and the fourth protrusion;

the plurality of gaps further comprise a third gap and a fourth gap, the third gap runs through the third protrusion and the substrate, and the fourth gap runs through the fourth protrusion and the substrate; and the plurality of electrode assemblies comprise a third electrode assembly and a fourth electrode assembly, the first tab of the third electrode assembly passes through the third gap and is connected to the second current collecting plate, and the first tab of the fourth electrode assembly passes through the fourth gap and is connected to the second current collecting plate.

18. The secondary battery according to claim 7, wherein the plurality of protrusions comprise a third protrusion and a fourth protrusion, the first protrusion, the second protrusion, the third protrusion and the fourth protrusion are arranged sequentially along the longitudinal direction;

the current collecting member further comprises a second current collecting plate, and the second current collecting plate is located between the third protrusion and the fourth protrusion;

the plurality of gaps further comprise a third gap and a fourth gap, the third gap runs through the third protrusion and the substrate, and the fourth gap runs through the fourth protrusion and the substrate; and the plurality of electrode assemblies comprise a third electrode assembly and a fourth electrode assembly, the first tab of the third electrode assembly passes through the third gap and is connected to the second current collecting plate, and the first tab of the fourth electrode assembly passes through the fourth gap and is connected to the second current collecting plate.

19. The secondary battery according to claim 8, wherein the plurality of protrusions comprise a third protrusion and a fourth protrusion, the first protrusion, the second protrusion, the third protrusion and the fourth protrusion are arranged sequentially along the longitudinal direction;

the current collecting member further comprises a second current collecting plate, and the second current collecting plate is located between the third protrusion and the fourth protrusion;

the plurality of gaps further comprise a third gap and a fourth gap, the third gap runs through the third protrusion and the substrate, and the fourth gap runs through the fourth protrusion and the substrate; and the plurality of electrode assemblies comprise a third electrode assembly and a fourth electrode assembly, the first tab of the third electrode assembly passes through the third gap and is connected to the second current collecting plate, and the first tab of the fourth electrode assembly passes through the fourth gap and is connected to the second current collecting plate.

20. The secondary battery according to claim 2, wherein the insulation member is bonded to the current collecting member.

* * * * *